United States Patent [19]
Smith

[11] 3,866,483
[45] Feb. 18, 1975

[54] DRIVE BELT CONSTRUCTION
[76] Inventor: Thomas R. Smith, 710 W. 11th St. S., Newton, Iowa 50208
[22] Filed: Mar. 6, 1974
[21] Appl. No.: 448,704

[52] U.S. Cl................. 74/231 C, 74/237, 156/138
[51] Int. Cl.......... B29h 7/22, F16g 1/22, F16g 1/28
[58] Field of Search.......... 74/231 C, 231 P, 231 R, 74/237; 156/138

[56] References Cited
UNITED STATES PATENTS
| | | | |
|---|---|---|---|
| 3,404,578 | 10/1968 | Koch et al. | 74/231 C |
| 3,736,805 | 6/1973 | Dent | 74/231 C |

Primary Examiner—Leonard H. Gerin

[57] ABSTRACT

A drive belt is fabricated on a pulley-like form having an endless groove by installing a reinforcing wire in the groove for a plurality of spaced turns followed by installing, in turn, a polyurethane loop and a compression band over the wire. The polyurethane material is heated, by use of the reinforcing wire as a heater in one embodiment, and compressed into the recesses so that the wire is effectively embedded in the polyurethane body. In another embodiment two layers of polyurethane are placed in the groove with the reinforcing wire between the layers.

14 Claims, 5 Drawing Figures

PATENTED FEB 18 1975 3,866,483

3,866,483

DRIVE BELT CONSTRUCTION

BACKGROUND OF THE INVENTION

1. Field of the Invention

This invention relates to drive belts and more particularly to an improved reinforced drive belt construction.

2. Description of the Prior Art

Prior art reinforced drive belts have been fabricated by a process including a number of steps including the forming of elastomeric sheets, laying up the elastomeric sheets and reinforcing material on a drum, cutting the assembly into belt-sized loops, and molding and curing the assembled belt. This process requires extensive and expensive equipment and considerable labor. The advent of polyurethane has been accompanied by improved drive belt fabrication techniques but because of the extensibility of polyurethane there has existed a continuing need for an improved reinforced polyurethane drive belt construction.

SUMMARY OF THE INVENTION

It is an object of the instant invention to provide an improved reinforced elastomeric drive belt construction.

It is a further object of the instant invention to provide a reinforced polyurethane belt construction fabricated with a minimum of labor and equipment.

It is a still further object of the instant invention to provide a reinforced polyurethane drive belt fabrication technique including use of the reinforcing wire as a heater.

The instant invention achieved these objects in an elastomeric drive belt having reinforcing wire that is wrapped on a pulley-like form a plurality of spaced loops, that are also spaced above the base of the groove, followed by installing, in turn, an elastomeric loop and a compression band over the wire. The elastomeric loop is heated and compressed into the groove of the form so that the wire is effectively embedded in the elastomeric material.

Specific construction of the improved drive belt and further objects and advantages thereof will become evident as the description proceeds and from an examination of the accompanying sheet of drawings.

BRIEF DESCRIPTION OF THE DRAWINGS

The drawings illustrate a preferred embodiment of the invention with similar numerals referring to similar parts throughout the several views wherein.

DESCRIPTION OF A PREFERRED EMBODIMENT

Figure 1:
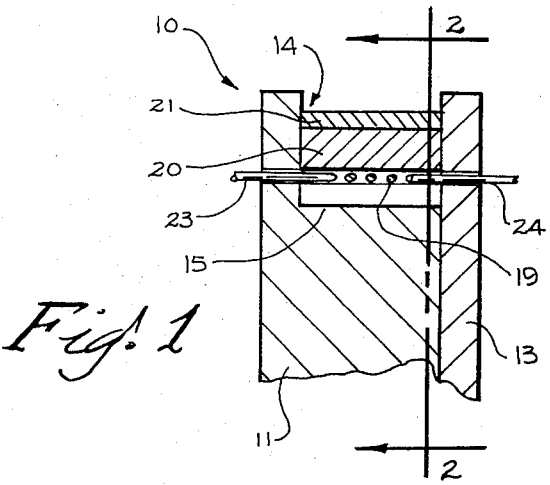
FIG. 1 is a fragmentary radial section of the assembled drive belt components on a form at an intermediate step in the fabrication process.
Figure 2:
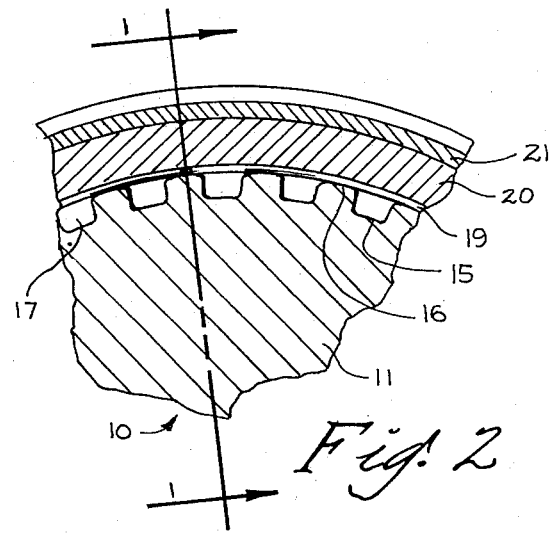
FIG. 2 is a fragmentary transverse sectional view as taken along lines 2—2 of FIG. 1.

Referring to FIGS. 1 and 2, there is shown a preliminary assembly of the reinforced drive belt of the instant invention on a representative form 10. The form 10 includes a body portion 11 and an end plate 13 which may be removably fixed to the body portion 11 to define a generally annular pulley-like groove 14. The form 10 may be constructed of Teflon or be coated with Teflon or similar material to insure release of the finished belt.

As best shown in FIG. 2, the base of the groove 14 is contoured to include a first inner radius 15 and a second outer radius 16 and forming recesses 17 so that the completed drive belt is fabricated as a toothed or cogged belt in this embodiment.

The components assembled into the groove 14 of the form 10 include a reinforcing wire 19 formed of electrically conductive metallic wire and which is used for the additional function of a resistance heater in this embodiment. The reinforcing wire may be formed as continuous loops or turns or formed as individual closed loops in another embodiment but both forms will be considered as included in the term "loops." The body of the belt comprises a polyurethane elastomeric loop 20 assembled over the wire 19 as in FIGS. 1 and 2. The loop 20 is formed as an endless loop having a predetermined cross sectional width and thickness in a preferred embodiment but may also be formed as a strip having the proper width and thickness and wrapped onto the form as a loop with the ends becoming integrally connected in the subsequent fabrication steps.

A compression band 21 comprising an endless silicone elastomeric belt is snapped over the polyurethane material 20. The silicone belt applies a generally uniform compression to the polyurethane material 20 and will stand the operating temperatures during the belt fabrication process. Other means could be used for applying a radial compression including a pneumatic tire on the outer periphery over the polyurethane material 20 in the groove 14.

After the form 10 has been assembled and the components 19, 20, 21 have been placed in the groove 14 as in FIGS. 1 and 2, the polyurethane 20 is heated to soften and at least partially melt the material adjacent to the turns of reinforcing wire 19 so that the polyurethane material 20, under the compression force of the silicone belt 21, will be forced between and around the wires 19 into the recesses 17 of the cog-type groove 14 to form a cogged belt having reinforcing wire 19 embedded therein.

In a preferred embodiment the heating of the polyurethane material 20 is accomplished by connecting the reinforcing wire 19 to a source of electric power and passing an electric heating current through the wire 19 for a period of time of sufficient duration to soften and melt at least the portion of polyurethane material 20 adjacent the wires 19. It is noted in FIG. 1 that the ends 23 and 24 of the wire 19 have been brought through the form 10 to facilitate connection to the power supply.

The wire 19 is wound on the form 10 a plurality of turns with adjacent turns being spaced apart to achieve electrical separation and to permit flow of polyurethane material 20 therebetween. It has been previously noted that the form 10 may be constructed of Teflon or be coated with a layer of Teflon and thus the current will not short circuit between adjacent turns of the wire 19.

Figure 3:
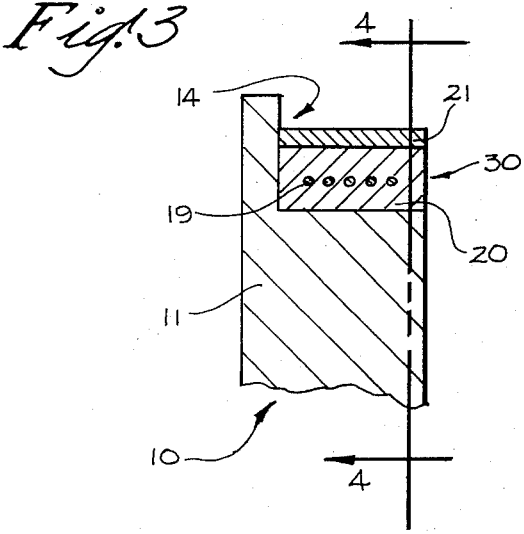
FIG. 3 is a fragmentary radial section similar to FIG. 1 and showing the completed belt prior to removal from the form.
Figure 4:
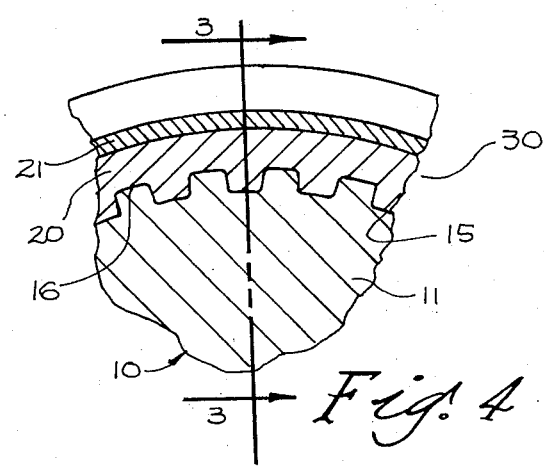
FIG. 4 is a fragmentary transverse sectional view as taken along lines 4—4 of FIG. 3.

Referring to FIGS. 3 and 4, the completed belt 30 is shown ready for removal from the form 10. It is clear that the belt 30 may be easily slipped off the form 10 once the end plate 13 has been disconnected from the body 11.

In a particular embodiment of the instant invention a reinforced drive belt 30 may be formed by a process including the following steps:

a. assembling a pulley-like mold or form 10 to provide a cog-type groove 14;

b. winding a metal wire 19 in the groove 14 for a plurality of turns with adjacent turns spaced apart approximately the width of the wire and bringing the ends 23, 24 through the form 10 for connection to an electrical power supply;

c. stretching an endless loop of polyurethane material 20 onto the form 10 over the wire 19;

d. stretching an endless belt 21 of silicone material onto the form 10 over the polyurethane material 20;

e. connecting an electrical power source across the ends 23, 24 of reinforcing wire 19 and passing an electrical heating current through the wire 19;

f. effect softening of the polyurethane material and, after the polyurethane material 20 has softened and melted for compression into the recesses 17 of the cog-type groove 14 and effectively embedding the wire 19 in the polyurethane material 20, disconnecting the power source and cooling the belt 30; and g. disconnecting the end plate 13 from the form 10 to permit removal of the compression band 21 and belt 30. Excess connecting wire protruding from the belt 30 may be clipped off at the surface thereof.

Figure 5:
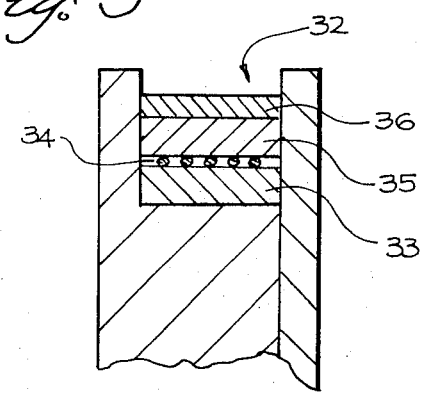
FIG. 5 is a fragmentary radial section similar to FIG. 1 showing an alternate construction.

The instant invention leads itself to various alternatives in the fabrication technique. Referring to FIG. 5, a cross section view shows an assembly of components ready for the heating step. In this embodiment a first loop of polyurethane 33 is placed in the annular groove 32, which is free of the cog-type recesses, prior to the reinforcing wire 34. A second loop of polyurethane 35 and the compression belt 36 are added as in the embodiment of FIG. 1. In the heating step the two layers of polyurethane 33, 35 become integrally welded together with the reinforcing wire embedded in polyurethane material.

In a further embodiment the reinforcing wire may be formed as individual closed or endless loops of metallic wire and assembled to the form as in either FIG. 1 or FIG. 5 with the individual loops spaced apart as in the other embodiments. The assembled form and belt components are then subjected to magnetic induction to effect a magnetic inductive heating of the metallic wire which will in turn heat the polyurethane material as in the other embodiments.

Other alternatives associated with the instant invention include: use of forms having different groove shapes such as a groove having slanted sides to form a V-shaped belt; use of uneven size and spacing of the recesses and wire supports in the groove including very narrow supports and long recesses; coating of the wire with adhesive to improve bonding with the polyurethane; and heating the polyurethane by placing the mold and assembled belt components in an oven.

The term "wire", as used herein, also comprises, in alternate embodiments, a cable or cord of non-metallic material such as fibre, plastic, or glass, for example, and includes an elongated member wound on the form or fabricated as individual closed loops for assembly to the form. With reinforcing wire of nonmetallic type, the heating is accomplished by use of an oven as previously suggested.

It is thus clear that the instant invention provides an improved reinforced drive belt construction that requires a minimum of labor and equipment.

In the foregoing drawings and specification there has been set forth a preferred embodiment of the invention and although specific terms are employed, these are used in a generic and descriptive sense only and not for purposes of limitation. Changes in form and the proportion of parts as well as the substitution of equivalents are contemplated as circumstances may suggest or render expedient without departing from the spirit or scope of this invention.

I claim:

1. A method of fabricating a reinforced drive belt comprising: assembling at least one loop of polyurethane material and a plurality of loops of generally nonextensible reinforcing material on a form that defines an endless groove, said loops of reinforcing material being placed in said groove for engagement with one surface of said loop of polyurethane material and with successive loops being spaced and electrically insulated from adjacent reinforcing loops; assembling a compression band over said reinforcing and polyurethane material; heating said polyurethane material to effect a softening thereof for embedding the loops of reinforcing material in the polyurethane material; cooling the polyurethane material; and removing the compression band and the fabricated belt from the form.

2. A method of fabricating a reinforced drive belt as defined in claim 1 wherein said reinforcing material comprises an elongated length of electrically conductive wire wrapped on said form for a plurality of continuous loops and connected to a source of electrical power for effecting electrical resistive heating of said reinforcing material.

3. A method of fabricating a reinforced drive belt as defined in claim 1 wherein said reinforcing material comprises electrically conductive wire that is first formed into a plurality of individual closed loops for assembly in said groove and wherein the form and belt components are subjected to magnetic induction to effect inductive heating of said loops of reinforcing material.

4. A method of fabricating a reinforced drive belt comprising: assembling at least one generally nonextensible reinforcing element on a form that defines an endless groove and that includes means for supporting the reinforcing element at a first radius spaced outwardly from a second inner radius at the base of the groove, a plurality of loops of said reinforcing element being placed in said groove at said first outer radius with successive loops being spaced from adjacent turns; assembling a loop of polyurethane elastomeric material over said reinforcing element in said groove; assembling a compression band over said polyurethane material; heating said polyurethane material to effect a softening thereof for compression of the polyurethane material around the loops of reinforcing element and into said second inner radius to effectively embed the reinforcing element in the polyurethane material: cooling the polyurethane material to retain the reinforcing element embedded therein; and removing the compression band and fabricated belt from the form.

5. A method of fabricating a reinforced drive belt as defined in claim 4 wherein the reinforcing element is metallic wire and is connected to an electric power supply to effect the heating of the polyurethane material.

6. A method of fabricating a reinforced drive belt as defined in claim 4 wherein the reinforcing element comprises a plurality of individual closed loops of electrically conductive material and wherein the assembly is subjected to magnetic induction for heating the metallic reinforcing loops.

7. A method of fabricating a reinforced drive belt as defined in claim 4 wherein an additional step comprises the fabrication of the polyurethane material as an endless loop for assembly over the reinforcing elements.

8. A method of fabricating a reinforced drive belt comprising: assembling a loop of polyurethane material and winding a metallic wire on a form that defines an endless groove, said wire being wound in said groove for engagement with one surface of said polyurethane material and being wound a plurality of turns with successive turns being spaced and electrically insulated from adjacent turns; assembling a compression band over said wire and polyurethane material; connecting said wire to an electric power supply and passing a heating current through said reinforcing wire for a period of time sufficient to soften the polyurethane material for compression thereof around the wire to effectively embed the wire in the polyurethane material; disconnecting the electric power supply from said reinforcing wire; cooling the polyurethane material; and removing the compression band and the fabricated belt from the form.

9. A method of fabricating a reinforced drive belt comprising: winding a metallic wire on a pulley-like form that defines a groove and that includes means for supporting the wire at a first radius spaced outwardly from a second radius at the base of the groove, said wire being wound in said groove at said first outer radius a plurality of turns with successive turns being spaced from adjacent turns; assembling a loop of polyurethane elastomeric material over said wire in said groove; assembling a compression band over said polyurethane material; connecting said wire to an electric power supply and passing a heating current through said reinforcing wire while the polyurethane material is subjected to pressure of said compression band for period of time of sufficient duration to soften the polyurethane material for compression around the turns of wire and into said second inner radius to effectively embed the wire in the polyurethane material; disconnecting the electric power supply; cooling the polyurethane material; and removing the compression band and the fabricated belt from the form.

10. A method of fabricating a reinforced drive belt as defined in claim 9 wherein an additional step comprises the forming of the polyurethane as an endless loop for assembly over the wire turns.

11. A method of fabricating a reinforced drive belt as defined in claim 9 wherein an addition step comprises the assembling of a first loop of polyurethane material in said groove preceeding the winding of said wire in the groove.

12. A method of fabricating a reinforced drive belt comprising: winding a metallic wire on a pulley-like form that defines a groove having a cog-like base including a first outer radius for receiving and supporting the wire spaced radially outwardly from a second inner radius, said wire being wound in said groove at said first outer radius a plurality of turns with successive turns being spaced from adjacent turns; assembling an endless loop of polyurethane elastomeric material in said groove over said wire; assembling an endless elastomeric compression band over said polyurethane material; connecting the ends of said wire to an electric power supply; passing a heating current through said reinforcing wire while subjected to pressure of said compression band; continuing the heating for a period of time of sufficient duration to soften the polyurethane material compression around the wire and into said second inner radius; interrupting the heating and disconnecting the power supply; cooling the polyurethane material; and removing the compression band and belt from the form.

13. A reinforced drive belt fabricated by winding a generally nonextensible reinforcing element on a form that defines an endless groove and that includes means for supporting the reinforcing element at a first radius spaced outwardly from a second inner radius at the base of the groove, said reinforcing element being wound in said groove at said first outer radius a plurality of turns with successive turns being spaced from adjacent turns; assembling a loop of polyurethane material over said reinforcing element in said groove; assembling a compression band outside of said polyurethane material; heating said polyurethane material to effect a softening thereof for compression of the polyurethane material around the turns of reinforcing element and filling in said groove to effectively embed the reinforcing element in the polyurethane material; cooling the polyurethane material to retain the reinforcing element embedded therein; and removing the compression band and fabricated belt from the form.

14. A reinforced drive belt fabricated by assembling a first loop of polyurethane material on a form that defines a groove; assembling a reinforcing element in said groove over said loop of polyurethane material including a plurality of turns with successive turns being spaced from adjacent turns; assembling a second loop of polyurethane material over the turns of reinforcing element; applying a compression band over the second loop of polyurethane material; heating said polyurethane material for a period of time of sufficient duration to soften at least the juxtaposed surfaces of the loops of polyurethane material for compression thereof around the reinforcing element to effectively join the two layers of polyurethane material and to embed the reinforcing element therein; cooling the polyurethane material; and removing the compression band and the fabricated belt from the form.

* * * * *